United States Patent
Mørk

(10) Patent No.: US 6,785,235 B1
(45) Date of Patent: Aug. 31, 2004

(54) PRIORITY CONTROL OF QUEUED DATA FRAMES IN FRAME DELAY MULTIPLEXING

(75) Inventor: Øivind Mørk, Tranby (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/485,787

(22) PCT Filed: Aug. 14, 1998

(86) PCT No.: PCT/NO98/00240

§ 371 (c)(1),
(2), (4) Date: Feb. 16, 2000

(87) PCT Pub. No.: WO99/09783

PCT Pub. Date: Feb. 25, 1999

(30) Foreign Application Priority Data

Aug. 18, 1997 (NO) .................................................. 973788

(51) Int. Cl.[7] .......................... H04L 12/26; H04L 12/56; H04L 12/54
(52) U.S. Cl. .......................... 370/234; 370/412; 370/429
(58) Field of Search ................................ 370/412, 413, 370/429, 230, 230.1, 235, 231, 235.1, 232, 234

(56) References Cited

U.S. PATENT DOCUMENTS

| | | | |
|---|---|---|---|
| 4,630,261 A | | 12/1986 | Irvin ............................ 370/81 |
| 5,231,633 A | * | 7/1993 | Hluchyj et al. .............. 370/429 |
| 5,444,820 A | | 8/1995 | Tzes et al. ..................... 395/22 |
| 5,521,923 A | | 5/1996 | Willmann et al. ......... 370/94.1 |
| 5,546,326 A | | 8/1996 | Tai et al. ..................... 364/552 |
| 5,566,163 A | * | 10/1996 | Petit ............................ 370/230 |
| 5,764,641 A | * | 6/1998 | Lin .............................. 370/412 |
| 5,812,526 A | * | 9/1998 | Chang et al. ................ 370/230 |
| 6,018,516 A | * | 1/2000 | Packer ........................ 370/231 |

FOREIGN PATENT DOCUMENTS

| | | |
|---|---|---|
| DE | 19609081 | 6/1997 |
| EP | 0 667570 | 8/1995 |
| EP | 0 705006 | 4/1996 |
| EP | 0 774846 | 5/1997 |
| WO | WO 96/15599 | 5/1996 |

OTHER PUBLICATIONS

Thomas D. Ndousee: Fuzzy Neural Control of Voice Cells in ATM Networks, IEEE Journal On Selected Areas in Communications, vol. 12, No. 9, Dec., 1994, pp. 1488–1494.*
Rydman, P.; International Search Report; International Application No. PCT/NO98/00240; Mar. 11, 1999; pp–1–2.

* cited by examiner

Primary Examiner—Hassan Kizou
Assistant Examiner—Timothy Lee

(57) ABSTRACT

A method related to a data communication system, and more specifically to frame relay multiplexing, in which system data frames are forwarded by nodes performing inter alia multiplexing and concentration of traffic from a plurality of input sources, and wherein the sum of transmission time in question, the queue delay and acknowledge frame transmission time, should not exceed a transmission timer setting, and for the purpose of solving the problem with queuing of data frames in such a communication network, it is according to the present invention suggested to combine the following steps: a) simulating an output queue length, b) estimating an input source traffic value, and c) using fuzzy logic, for thereby deciding when a data frame has to be deleted from the data stream.

7 Claims, 1 Drawing Sheet

PRIORITY CONTROL OF QUEUED DATA FRAMES IN FRAME DELAY MULTIPLEXING

Figure 1:
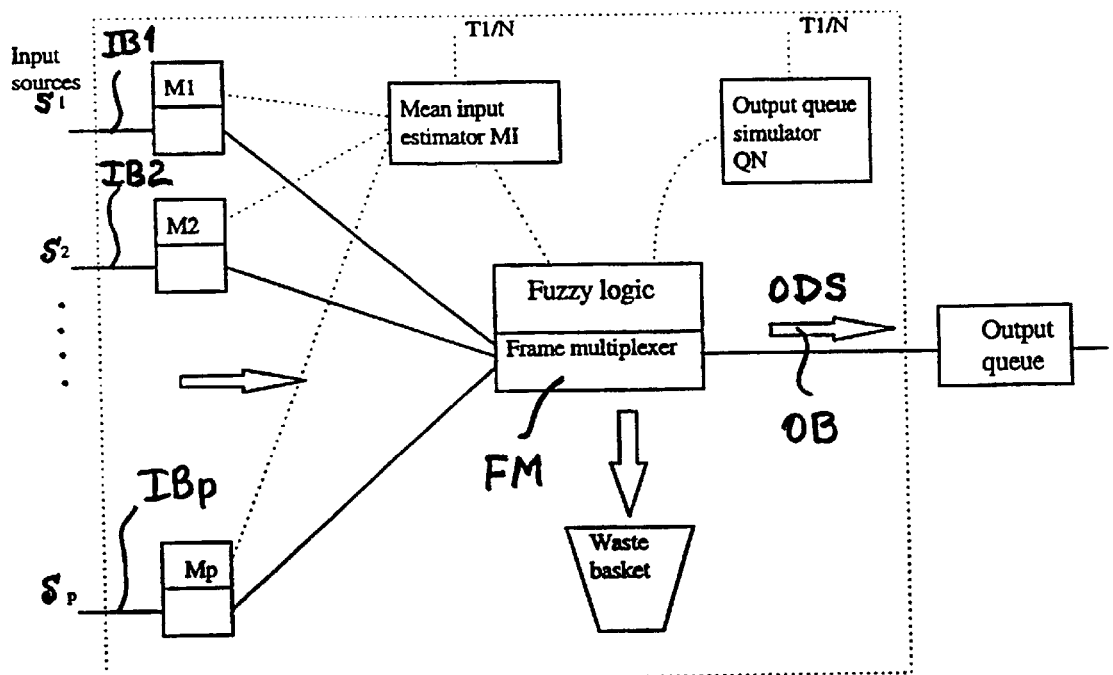

The present invention relates to a data communication system, and more specifically to frame relay multiplexing in such a system, and more specifically to priority controller for frame relay multiplexing.

TERMS AND DEFINITIONS

In order to better understand the technical background of the present invention, the following terms and definitions should be observed:

| LAPD | Link Access Protocol D channel ref.: ITU Q.921 |
|---|---|
| OSI model | Open System Interconnection Model divide a communication process in layer 1–7 |
| Physical layer | The lowest OSI model layer 1 responsible for activation, maintaining and deactivation of physical circuits |
| Data link layer | The OSI model layer 2 responsible for the transfer of data across a link with recovery from lost data and data with errors |
| Frame relay | Data communication where just the lower part of layer 2 is performed in nodes between the nodes with full layer 2 termination with error recovery. |

TECHNICAL BACKGROUND

In data communication frame relay is often used. In this case the data frames are forwarded by many nodes before the layer 2 protocol is terminated. If one of these nodes does a multiplexing and concentration of the traffic from many sources, there is a possibility of communication overflow in some time intervals. If the sum of the data rates from the sources is greater than in the destination direction, a frame queue will build up at the output port. The frames may be delayed too much in this queue to be acknowledged before the retransmission timer of the layer 2 source expires.

THE PROBLEM AREA

The layer 2 protocol like LAPD has by default a retransmission time of T1 second. The sum of the transmission time, the queue delay and transmission time of the acknowledge frame must not exceed these T1 seconds. If this sum is greater than T1, the frame will be retransmitted from the source. The frame will probably be placed in the queue once more. This in turn means that traffic from other sources may be delayed too much and the useful throughput will decrease.

PRIOR ART AND KNOWN SOLUTIONS

One way to solve this problem will be to measure the real output queue and give all sources the same probability to enter the queue based on a statistical measurement of the sources. This solution requires a lot of computations.

From U.S. Pat. No. 5,231,633 (Hluchyj et al.) is known a method for prioritising, selectively discarding and multiplexing different traffic type fast packets, and more specifically a queuing and dequeuing mechanism for use in an integrated fast packet network.

According to this prior art fast packets from differing traffic types are multiplexed with one another through use of a weighted round-robin bandwidth allocation mechanism. Although this prior art technique has to do with packet communication and multiplexing associated therewith, this prior art is silent as regards any suggestion of using fuzzy logic for the decision of when a data frame has to be deleted from the data stream in question.

OBJECTS OF THE INVENTIONS

The main object of the present invention is to provide an appropriate solution to the queuing of data frames in a communication network.

Another object of the present invention is to provide a method by which data frames which by fuzzy logic are estimated to have a small possibility to be transmitted in time, are deleted and not sent to the output queue, preferably by letting frames from sources with high traffic be deleted first.

Still another object of the invention is to provide a method by which the size of the output data queue is affected by using fuzzy logic.

SUMMARY OF THE INVENTION

In other words, the invention solves the above problem by an output queue length simulation, an input source traffic estimator and fuzzy logic for the decision of when a data frame has to be deleted from the data stream. The main advantages with this solution are low processor load and simplicity by a combination of a few principles.

Further advantages of the present invention will appear from the following description taken in connection with the enclosed drawing, as well as from the appended patent claims.

BRIEF DISCLOSURE OF THE DRAWING

FIG. 1 is a block diagram illustrating a network structure, wherein an embodiment of the present invention is realised.

DETAILED DESCRIPTION OF THE INVENTION

In FIG. 1 there is illustrated in block diagram a network structure wherein the solution according to the present invention is realised.

In FIG. 1 there are illustrated a plurality of input sources S1, S2 . . . Sp, and the bandwidth from the sources are indicated with IB (IB1, IB2 . . . IBp, respectively). The sources may have different bandwidths, but the equations to be used are valid for the same speed for all sources.

The frames from the many sources S1, S2 . . . Sp re multiplexed in a frame multiplexer FM to one outgoing data stream ODS. The sum of the bandwidths from all sources will in this case be larger than the bandwidth OB for the outgoing data stream ODS. Consequently, the traffic from the mentioned sources will in some time periods be higher than the possible output data stream ODS.

Output Queue Simulator

The output queue length is simulated every $T1/N$ seconds where T1 is the layer 2 retransmission timer and $N=2$ or 4. The queue length simulation is done by decrementing a byte counter, QN, every $T1/N$ second with a value $OB*T1/N$ representing the transmitted data in the last $T1/N$ interval. The QN counter is increased with the number of bytes in the frame each time a frame is put in the real queue.

Every $T1/N$ seconds the following statements are processed:
If $(QN>OB*T1/N)$ $QN=QN-(OB*T1/N)$
ELSE $QN=0$
For every frame sent into the real queue:
$QN=QN+$(effective frame length including flags)

Input Traffic Measurement

The input of each source is calculated every T1/N seconds. The value is calculated as the transmitted number of bytes for the last second. To do this N+1 counters are needed for each source. One counter is used for each of the N intervals in a second, and one counter keeps the sum of the N counters. For each interval the sum, Mp, of the counters is calculated and the oldest value removed.

The bandwidth of the source is IB (bytes/s) and Mp is always less than IB.

Mean Input Estimator

The mean value of the input sources is calculated (MI). This is done every T1/N second. This value will be used by the fuzzy logic when it has to decide if a frame shall be deleted.

In the mean value calculation just sources above a small input level of 1/10*IB are included. We just want to compute the mean value for the sources that are transmitting much data.

```
n=0; MI=0;
For source 1 to p {
    if (Mp > 0.1 * IB) ( n=n+1; MI=MI + Mp; }
}
MI = MI/n;
```

Fuzzy Logic

The fuzzy logic can be expressed in verbal way like this: When a frame is received and the queue is so long that the frame probably will be transmitted too late, it is better to delete it now. The frame is not deleted if it is very short. The frame is deleted if the frame comes from a source that has sent more than the average among the sources that sends a lot.

When a frame is received from any source, do the following:

If the output queue length, QN, is longer than what can be transmitted in this interval and a fraction d(0<d<1) of the next interval i.e. QN>(1+d)*OB*T1/N, the frame is a candidate for the waste basket. If the frame is a control frame (length<20 bytes) then do not delete it.

If the frame comes from a source with a traffic indicator Mp>MI, then delete the frame. If Qn>2*OB*T1/N, delete the frame with no test on Mp.

Advantage

The advantage with the invention is higher throughput of a frame relay multiplexer stops jamming from one source gives priority to short frames gives priority to sources below average low processing load low memory requirements no knowledge of the real output queue is required (this may be difficult to compute because the queue may partly exist in hardware)

different priority schemes may be implemented the priority scheme can be understood in intuitive way the algorithm will not reduce the throughput when the mean traffic is low Broadening These principles may be used where a concentration of traffic occurs and where it is important to keep the output queue delay time below a limit.

In the enclosed appendix there is given an example of the algorithms for a packet concentrator with p=14 sources and 1 output queue.

APPENDIX

An example of the algorithms for a packet concentrator with p = 14 sources and 1 output queue is described below.
The bandwidth of the sources is IB = 2000 byte/second and the bandwidth for the output is OB = 8000 bytes/second.
Retransmission timer T1 = 1 second.
Number of samples per seoond is N = 2.
Time supervision timer T1/N = 0.5 sec.
Every 0.5 second the following is computed
Output queue simulator, QN, is calculated as
IF (QN > 4000) QN = QN − 4000; // 4000 bytes are transmitted in 0.5 second
ELSE QN = 0;
The simulated queue is correct after this calculation.
Input source traffic over the last two intervals
FOR all ports n=1 to 14
{
    Mp(n) = Ti1(n) + Ti2(n);  // sum of the two last intervals
    Ti2(n) = Ti1(n);  // store last interval in Ti2
    Ti1(n) = 0;  // clear Ti1 for counting next interval
}  // end for;
Mean input estimator
Ml = 0; Ni = 0;
For all ports n = 1 to 14
{
    IF ( Mp(n) > 100)  // traffic below 100 bytes is not counted
    {
        Ml = Ml + Mp(n);  // calculate the sum
        Ni = Ni + 1;  // count the number of sources
    }
}  // end for;
Ml = Ml/Ni;  // Ml is now the mean value of the counters > 100
For every frame sent from wny of the sources to the output queue do fuzzy logic width d=0.75:
IF (QN > 7000)  // If 1,400 * (1+0.75)
{
    IF (frame length > 20 and Mp(n) > Ml) // If 2, frames < 20 is not deleted
    {
        delete the frame;
        return;  // without sending the frame to the output queue
    }  // end if 2
}  end if 1
QN = QN + frame length;  // update the queue simulator
Ti1(n) = Ti1(n) + frame length;  // update the input traffic measurement
send frame to the output queue;

What is claimed is:

1. A method for controlling the transmission of data frames in an apparatus that multiplexes traffic from a plurality of inputs into a single output data stream having an output queue, wherein the sum of the bandwidths for said traffic from said plurality of inputs can sometimes exceed the maximum bandwidth of said output, said method comprising the steps of:

A.) periodically:

i) estimating the delay of said output queue;

ii) calculating the bandwidth of each of said inputs; and iii) calculating the mean bandwidth value of at least some of said plurality of inputs; and B.) for each data frame received by each of said plurality of inputs, unless said data frame is a control frame or has a length less than a predefined value, dropping the transmission of said data frame if:

i) the delay of said output queue exceeds a predefined retransmission value associated with said data frame; and ii) said data frame is received from a source having a bandwidth that exceeds said mean bandwidth value.

2. The method recited in claim 1, wherein said periodic steps are performed at least every T1/N seconds, wherein T1 equals said predefined retransmission value.

3. The method recited in claim 2, wherein N equals 2.

4. The method recited in claim 2, wherein said step of estimating the delay of said output queue comprises the step of decrementing a counter every T1/N seconds with a value representing the transmitted data in the last T1/N interval.

5. The method recited in claim 4, further comprising the step of incrementing said counter by the number of bytes in the data frame each time a frame is put in the queue.

6. The method recited in claim 1, wherein said step of calculating the mean bandwidth value of at least some of said plurality of inputs comprises calculating said mean bandwidth value for ones of said plurality of inputs having a bandwidth exceeding a predefined value during a predefined window.

7. The method recited in claim 6, wherein said predefined window comprises the prior one second.

* * * * *